(12) United States Patent
Wei

(10) Patent No.: US 12,008,826 B2
(45) Date of Patent: Jun. 11, 2024

(54) METHOD AND APPARATUS FOR CUSTOMIZED DEEP LEARNING-BASED TEXT CORRECTION

(71) Applicant: KONICA MINOLTA BUSINESS SOLUTIONS U.S.A., INC., Foster City, CA (US)

(72) Inventor: Junchao Wei, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 382 days.

(21) Appl. No.: 17/491,122

(22) Filed: Sep. 30, 2021

(65) Prior Publication Data

US 2023/0096700 A1    Mar. 30, 2023

(51) Int. Cl.
*G06V 30/12* (2022.01)
*G06F 18/20* (2023.01)
*G06F 18/214* (2023.01)
*G06N 3/045* (2023.01)
*G06V 30/18* (2022.01)

(52) U.S. Cl.
CPC ............ *G06V 30/12* (2022.01); *G06F 18/214* (2023.01); *G06F 18/285* (2023.01); *G06N 3/045* (2023.01); *G06V 30/18* (2022.01)

(58) Field of Classification Search
CPC .................................................... G06N 3/045
See application file for complete search history.

(56) References Cited

U.S. PATENT DOCUMENTS

| 11,734,567 | B2* | 8/2023 | Kasiviswanathan ..... G06N 3/08 706/25 |
| 2009/0254819 | A1 | 10/2009 | Song et al. |
| 2009/0281972 | A1 | 11/2009 | Shahani et al. |
| 2020/0250417 | A1* | 8/2020 | Torres .............. G06V 30/19173 |

(Continued)

FOREIGN PATENT DOCUMENTS

| CN | 113298632 | 8/2021 |
| JP | 2011-065322 A | 3/2011 |
| JP | 2021-135695 A | 9/2021 |

OTHER PUBLICATIONS

"Levenshtein distance", from Wikipedia, the free encyclopedia; last edited Sep. 20, 2021, at 10:14 (UTC), accessed Oct. 11, 2021.

(Continued)

*Primary Examiner* — Edward Park
(74) *Attorney, Agent, or Firm* — SQUIRE PATTON BOGGS (US) LLP

(57) ABSTRACT

A text correction engine meets different and changing end user requirements, with the ability to change a desired output by providing sufficient amounts of data, and by finetuning the appropriate text correction engine at the point of origin of the data. It is possible to retain confidentiality of data by retraining the base deep learning model at the base deep learning model's point of origin, to improve the base deep learning model's performance, making the base deep learning model more accurate for different contexts. Separate training of an end user model, leaving the base deep learning model intact, streamlines end user model training, and highlights desirable changes in the base deep learning model for further training or retraining.

20 Claims, 12 Drawing Sheets

(56) References Cited

U.S. PATENT DOCUMENTS

2021/0133476 A1\* 5/2021 Goodman ............. G06F 18/214
2023/0096700 A1\* 3/2023 Wei ...................... G06N 3/0442
　　　　　　　　　　　　　　　　　　　　382/157

OTHER PUBLICATIONS

Devlin et al., "BERT: Pre-training of Deep Bidirectional Transformers for Language Understanding", arXiv: 1810.04805v2 [cs.CL] May 24, 2019.
Hannun, Awni; "Sequence Modeling With CTC", Distill, Nov. 27, 2017; doi: 10.23915/distill.00008.
Hochreiter et al., "Long Short-Term Memory", Neural Computation 9, 1735-1780 (1997).
Imagenet, "ImageNet—About ImageNet", https://www.image-net.org/https://www.image-net.org/about.php, accessed Oct. 11, 2021; 3 pages.
Notice of Reasons for Refusal issued in corresponding Japanese Patent Application No. 2022-092288 dated Jan. 30, 2024, with English language machine translation thereof.

\* cited by examiner

| Model Name | M1 | M2 | M3 | M4 | M5 | M6 | M7 |
|---|---|---|---|---|---|---|---|
| Main Structure | BERT+CTC | BERT+CE | NMT+CTC | NMT+CE | Bi-LSTM+MLP | Bi-LSTM+BERT+CE | Bi-LSTM+BERT+CTC |
| Correction Rate (%) | 61.72 | 60.78 | 53.9 | 51.2 | 79.2 | 87.12 | 89.92 |
| Broken Rate (%) | 1.18 | 1.6 | 2.2 | 1.9 | 1.6 | 2.31 | 2.20 |
| Training Dataset | Synthetic 50/50 | Synthetic 50/50 | Synthetic 50/50 | Synthetic 50/50 | Synthetic 50/50 | Synthetic 50/50 | Synthetic 50/50+ Real |
| Testing Dataset | Synthetic 50/50 | Synthetic 50/50 | Synthetic 50/50 | Synthetic 50/50 | Synthetic 50/50 | Synthetic 50/50 | Real 634/2536/3170 |
| Overall Accuracy (%) | 77.87 | 68.29 | 64.73 | 62.82 | 82.91 | 89.23 | 91.42 |

FIG. 8

METHOD AND APPARATUS FOR CUSTOMIZED DEEP LEARNING-BASED TEXT CORRECTION

BACKGROUND OF THE INVENTION

One of the challenges for deep learning based text correction engines in image character recognition (ICR) and optical character recognition (OCR) relates to the importance of context. As used throughout this specification, correction can mean fixing a letter, a series of letters, or a word or series of words. Correction also can mean adding a missing word or series of words, for example, in the case of filling in a form. In all of these types of correction situations, context matters.

A text correction engine can interpret a string of text and need to make a correction, but the correction may be different depending on context. For example, a text correction engine may read some input characters as the word "boak". That word may be corrected to "book" in one context (for example, when an end user is a library or publisher), and "boat" in another context (for example, when the end user is a manufacturer of ships or ship parts). Without that context, it is difficult for a deep learning algorithm in a text correction engine to determining what correction to make. Making the wrong correction to a deep learning algorithm can send the algorithm in a wrong direction, more distant from the right correction.

Relatedly, a text correction engine may encounter similar sequences of characters, with similar degradation issues, in different contexts, and not know how to make the appropriate correction.

It would be desirable to have a text correction engine that can adapt to different requirements in different contexts, driven by the appropriate contextually relevant data. One of the challenges in doing so is that a deep learning system which can make the corrections relies on training sets. Different training sets, presenting different contexts, can send the deep learning system in different directions to correct a text sequence. Accordingly, it also would be desirable to be able to train different deep learning systems with different training sets appropriate to different contexts.

There can be technological challenges associated with training these different deep learning systems appropriately. For example, training at the end user side with large quantities of data can be very time consuming. Even when the training is accomplished, a result of the training may not be applicable to needs of other end users (part of the contextual problem mentioned above). There also can be an issue of bias that comes in to a dataset. For example, differences in Eastern and Western cultures can lead to bias in a dataset that may have labeling and/or ground truths directed more to Eastern than to Western, or vice versa.

It is common for a capable deep learning network to contain a large number of parameters to be trained and optimized. For example, there are about 60 million parameters in a database called ImageNet (http://www.image-net.org/), which was developed for general purpose image recognition of over 200 classes of objects. Training a deep learning network with a dataset that size requires server-grade computing equipment, and a long time to achieve good performance. Also, the network training dataset can contain more than 100,000 labeled images. Because of the size of the dataset, it is not practical to ship the dataset for the end user machine to retrain the network.

Even if an end user were able to handle such a large dataset, the accuracy will not be sufficiently high because of a large ratio of base dataset size to end user dataset size. Further, some of the labeled data in the end user dataset (part of the training data for a deep learning model at the end user side) could be inconsistent with, or may even contradict data in the base dataset (part of the training data for the model at the host side). Bias can be one source of this problem, including in the ImageNet database mentioned above. Using such different and even contradictory training data can send one or both of a base deep learning model and an end user deep learning model in unintended directions, and make the model less accurate rather than more accurate.

SUMMARY OF THE INVENTION

In view of the foregoing, embodiments according to the present invention provide a text correction engine that can meet different and changing end user requirements. For different requirements, the desired output can be changed by providing sufficient amounts of data, and by finetuning the appropriate text correction engine at the point of origin of the data. It is possible to retain confidentiality of data by retraining the base deep learning model at the base deep learning model's point of origin. Improving the base deep learning model in this way can improve the base deep learning model's performance, making the base deep learning model more accurate for different contexts.

This approach also enables periodic improvement in base deep learning model performance with available contextual data, and with verified or checked data. Manual checking of the resulting data sets also can improve quality and training conformity. Moreover, separate training of an end user model, while leaving the base deep learning model intact, can streamline end user model training, and can serve to highlight desirable changes in the base deep learning model for further training or retraining.

BRIEF DESCRIPTION OF THE DRAWINGS

Various aspects according to embodiments of the present invention now will be described in detail with reference to the following drawings, in which:

FIG. 8 is a table depicting text correction results for different deep learning models according to various embodiments;

DETAILED DESCRIPTION OF EMBODIMENTS

Figure 1:
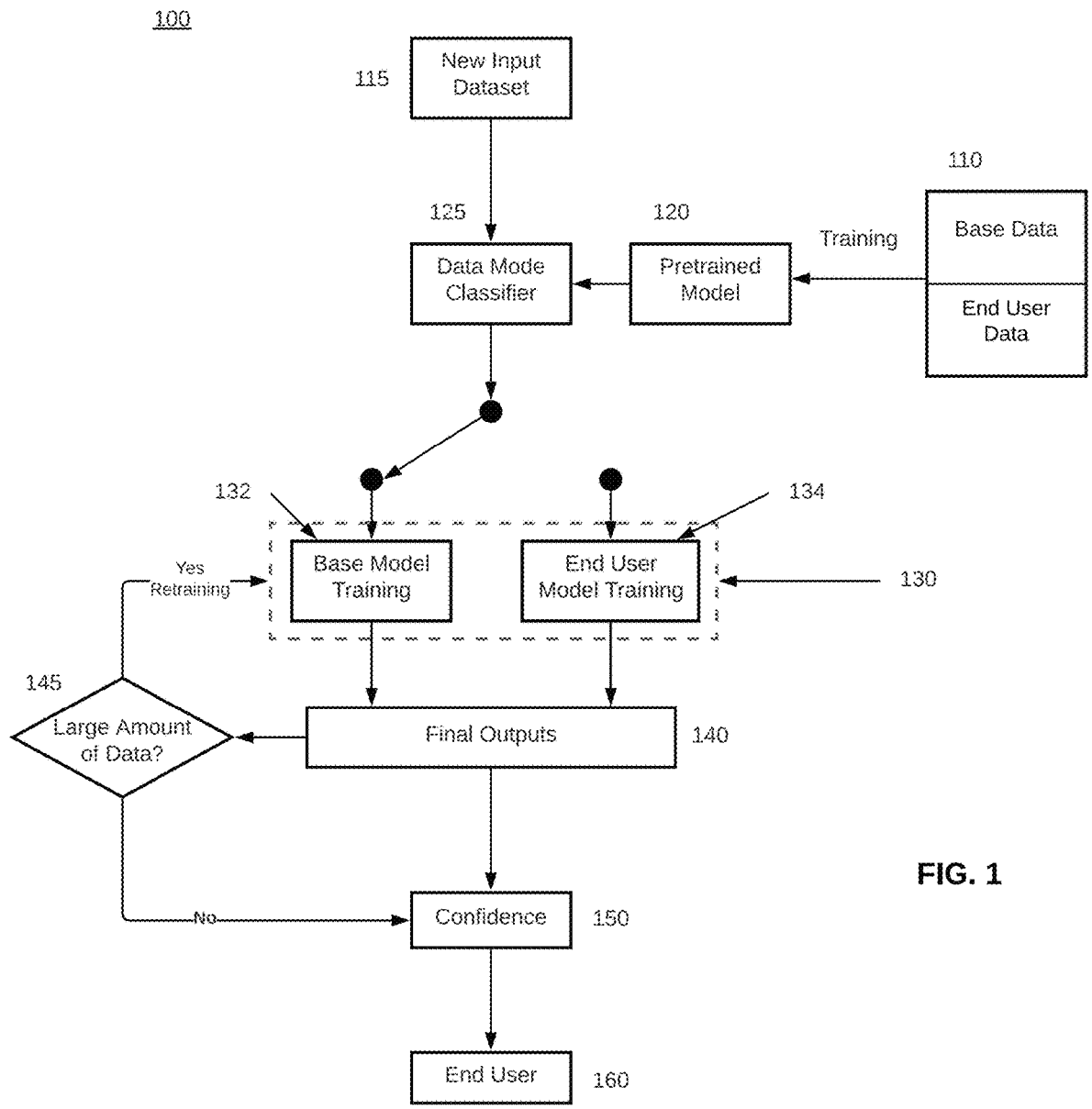
FIG. 1 is a high-level diagram of the flow of model correction according to an embodiment.

Aspects of the present invention provide a computer-implemented text correction method comprising:
with a processor, providing one of base data and end user data to pretrain a base deep learning model or an end user deep learning model, respectively, as a pretrained base deep learning model or a pretrained end user deep learning model;
providing a processor-based data mode classifier to select one of the pretrained base deep learning model or a pretrained end user deep learning model;
responsive to an input dataset, selecting one of the pretrained base deep learning model or the processor-based data mode classifier;
responsive to an output of the data mode classifier, performing training on one of the base deep learning model or the end user deep learning model;
responsive to a size of the dataset, performing retraining on one of the base deep learning model or the end user deep learning model;
responsive to the training of one of the base deep learning model or the end user deep learning model, providing outputs signifying a confidence level of the training; and
responsive to the confidence level of the training, providing output text to an end user.

In an embodiment, the text correction comprises one or more of image character recognition (ICR) and optical character recognition (OCR).

In an embodiment, the method further comprises, responsive to providing the outputs to the end user, performing correction of the output text.

In an embodiment, the method further comprises:
responsive to the input dataset, performing training on the base deep learning model; and
responsive to a size of the dataset, performing retraining on the base deep learning model.

In an embodiment, the method further comprises:
responsive to an output of the data mode classifier, performing training on the base deep learning model; and
responsive to a size of the dataset, performing retraining on the base deep learning model.

In an embodiment, the method further comprises:
responsive to an output of the data mode classifier, performing training on the end user deep learning model;
responsive to a size of the dataset, performing retraining on the end user deep learning model.

In an embodiment, training and retraining of the end user deep learning model does not affect the base deep learning model.

In an embodiment, the base deep learning model and the end user deep learning model are selected from the group consisting of Bidirectional Encoders from Transformers (BERT) Bidirectional Long Short Term Memory (Bi-LSTM) and Neural Machine Translation (NMT). In a particular embodiment, the base deep learning model and the end user deep learning model comprise a Bi-LSTM and BERT model with Connectionist Temporal Classification (CTC) loss.

In an embodiment, wherein the end user deep learning model comprises the base deep learning model and an output layer at an output of the base deep learning model.

Aspects of the present invention provide a computer-implemented text correction method comprising:
a processor; and
non-transitory memory containing instructions which, when performed by a processor, enable performance of a method as set forth above.

In an embodiment, a model switching system enables classification and selection of input data to be sent either to the base model or to an end user model. A data pattern classifier can use the base model backbone as a feature vector extractor. The classifier can identify data that the end user has corrected previously, or that is similar to and matches a corrected data error pattern. End user corrected text or similar text can be automatically corrected by the end user model if passed through the classifier a second time.

FIG. 1 shows a data pattern classifier for selecting the base model or the end user model to process incoming text according to an embodiment. In FIG. 1, at 110 base data and end user data are provided as training data to yield a pretrained model 120. That pretrained model, and a new input dataset at 115, are input to a data mode classifier 125, which uses the data to determine whether the base model 132 or the end user model 134 in block 130 will be the model to undergo further inference and training. Initially, before training the end user model 134, by default the data mode classifier 125 will send all data to the base model 132 for training. The results of that training will go to the end user for validation. If there are errors, the end user can make the corrections manually, and an appropriately labeled corrected dataset can be created. That corrected dataset then can be used as an initial dataset for training both the data mode classifier 125 and the end user model 134. In the overall process, the user-corrected and manually labeled data would be used for training the end user model. The corrected inferred data then will be collected and used for training the base model, so as to improve accuracy of the base model. The entire dataset then can be used to update the data mode classifier 125.

Ordinarily skilled artisans will appreciate that the base model dataset will continue to grow. In an embodiment, the base model dataset will be considerably larger than the end user model dataset, which may be unique to a particular end user, even if the base model dataset does not include some or all of the end user model dataset.

In an embodiment, the identification of the pretrained model being input to the data mode classifier 125 can determine which model is to undergo further training. In an embodiment, the input dataset 115 can provide some indication. The diagonal arrow coming from the data mode classifier 125 will point to either the base model 132 or the end user model 134.

Whichever model is being worked on provides final outputs at 140. At 145, if there is a significant amount of data in the new input dataset 115, there is at least a good likelihood that whichever model is being worked on (the base model 132 or the end user model 134) will need to undergo further training (retraining). In this event, flow in FIG. 1 goes back to the appropriate one of the base model 132 or the end user model 134 for the retraining action. This is an additional or different training from what was mentioned earlier with respect to FIG. 1.

Once the retraining is accomplished, if there is not a large amount of further data to be put into the model, then a confidence level is output at 150, and the model output provided to the end user at 160. As will be discussed later, the base model forms a basis for any of a plurality of end user models which provide different contexts for text understanding and translation/interpretation.

In an embodiment, both the base model 132 and the end user model 134 may share the same structure and pre-trained weights. The base model may generate a first batch of inferences for the end user to validate and approve. If the base model is 100% accurate, there will be no incorrect inferences, and hence no need for any end user corrections. If there is some percentage of inferences (for example, five percent) that do not meet the end user's requirement, the end user can modify the inference results to the end user's targets. The classifier may be trained as a binary classifier for selecting end user model, and may output '0' (false) for the base model data and '1' (true) for the end user model data. The end user model can be trained with the modified input and ground truth pairs. Then, those inputs will be corrected to their modified targets in the next iteration.

In an embodiment, the base model is pre-trained at a host side. The base model is fixed and cannot be modified within the end user system. The base model will be re-trained and updated at the host side if there is a sufficiently large amount of real data collected from different end users and applications. Final human validation of the data is required before adding the data to the base dataset to effect the re-training or updating.

In an embodiment, the end user model will be empty if there is no end user involvement and/or correction from the base model inference. The end user model will be re-trained and updated once there are post-corrections available from the end user. In an embodiment, the data mode classifier 125 is updated while the end user model is being updated. In an embodiment, the classifier threshold may have an initial default value of 1.0. The classifier threshold a may be in a range of 0.0 a 1.0. In an embodiment, the classifier threshold a may be in a range of 0.5 a 1.0. The classifier threshold a may be updated and learned according to the capability of the end user model. In an embodiment, an end user may set a flag equal to the classifier output, resulting in a change of the classifier threshold a as necessary or appropriate. For example, if there is a large amount of end user data for training the model, the inference capability will move the classifier to lower the threshold as a higher/increased confidence of passing data to the end user model to handle similar data patterns.

In an embodiment, the inference may be set as a sum of base inference and end user inference, in proportions corresponding to the amount of end user data, yielding a relationship $$\text{Inference} = (1 - \text{End User}) * \text{Inference}_{Base} + \text{End User} * \text{Inference}_{End\ User}$$

Ordinarily skilled artisans will appreciate that, given the relationship of the base model to the end user model as described herein, in an embodiment the classifier threshold a may be updated and learned during retraining of both the base model and the end user model.

Figure 2:
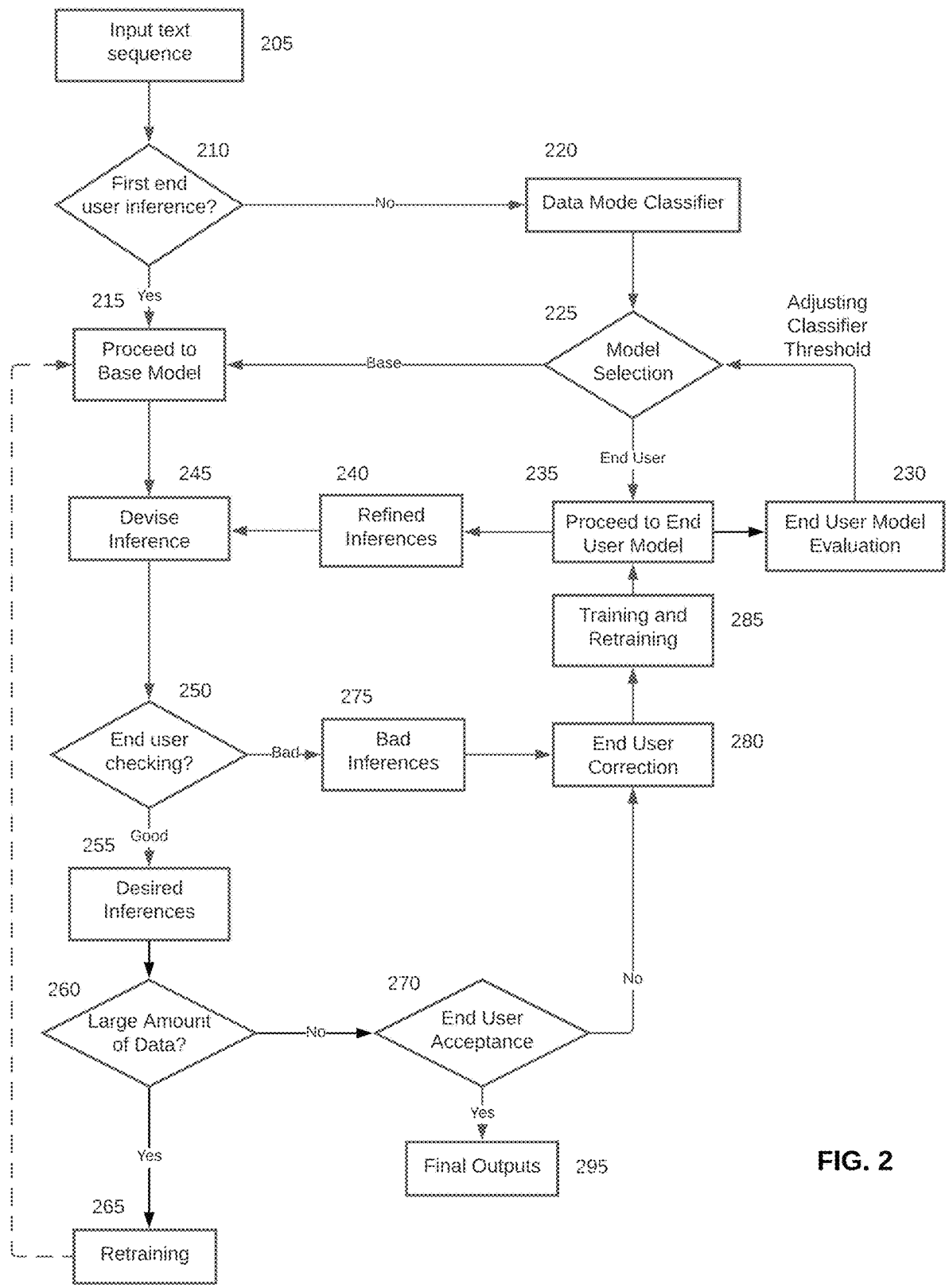
FIG. 2 is a lower-level diagram to show some additional details of the flow that FIG. 1 depicts.

FIG. 2 shows an overview of the flow of an adaptive and self-learning correction system according to an embodiment. FIG. 2 demonstrates the overall picture of the adaptive and self-learning system, which illustrates the workflow mentioned in the previous paragraph. Near the bottom of the figure, the end user system accumulates end user data. The end user model uses all available data for retraining and evaluation. Therefore, the end user model is mainly data-driven by available data, and by adapting to requirements of particular end users.

Looking more closely at FIG. 2, at 205 a text sequence is input, similarly to FIG. 1. At 210, if this is a first instance of an end user inference, at 215 the base model is selected to be worked on. If this is not the first end user inference, then flow proceeds to the data mode classifier at 220. At 225, model selection (base model or end user model) is carried out. If the base model is selected, then flow goes to 215, and then to 245, at which inferences are devised. End user checking is carried out at 250. If the result of the end user checking is good, then at 255 desired inferences are output. At 260, an amount of data involved in the current iteration of text correction is determined. At 265, similarly to FIG. 1, if there is a large amount of data, retraining of the base model may be carried out. At 270, similarly to FIG. 1, if there is not a large amount of data, output is provided for end user acceptance. At 295, if the end user accepts the output, then final outputs are provided. At 280, if the end user does not accept the output, then there is end user correction, with training and retraining being performed at 285. After retraining, at 235 the end user model again is selected. In this case, however, because there has been retraining, at 230 the end user model may be evaluated or re-evaluated, and the data mode classifier threshold (threshold amount of accuracy determining whether the base model or the end user model will be selected for further training) may be adjusted. At this point, flow returns to 225, with selection of the model (base model or end user model) to be worked on at the next iteration.

Figure 3:
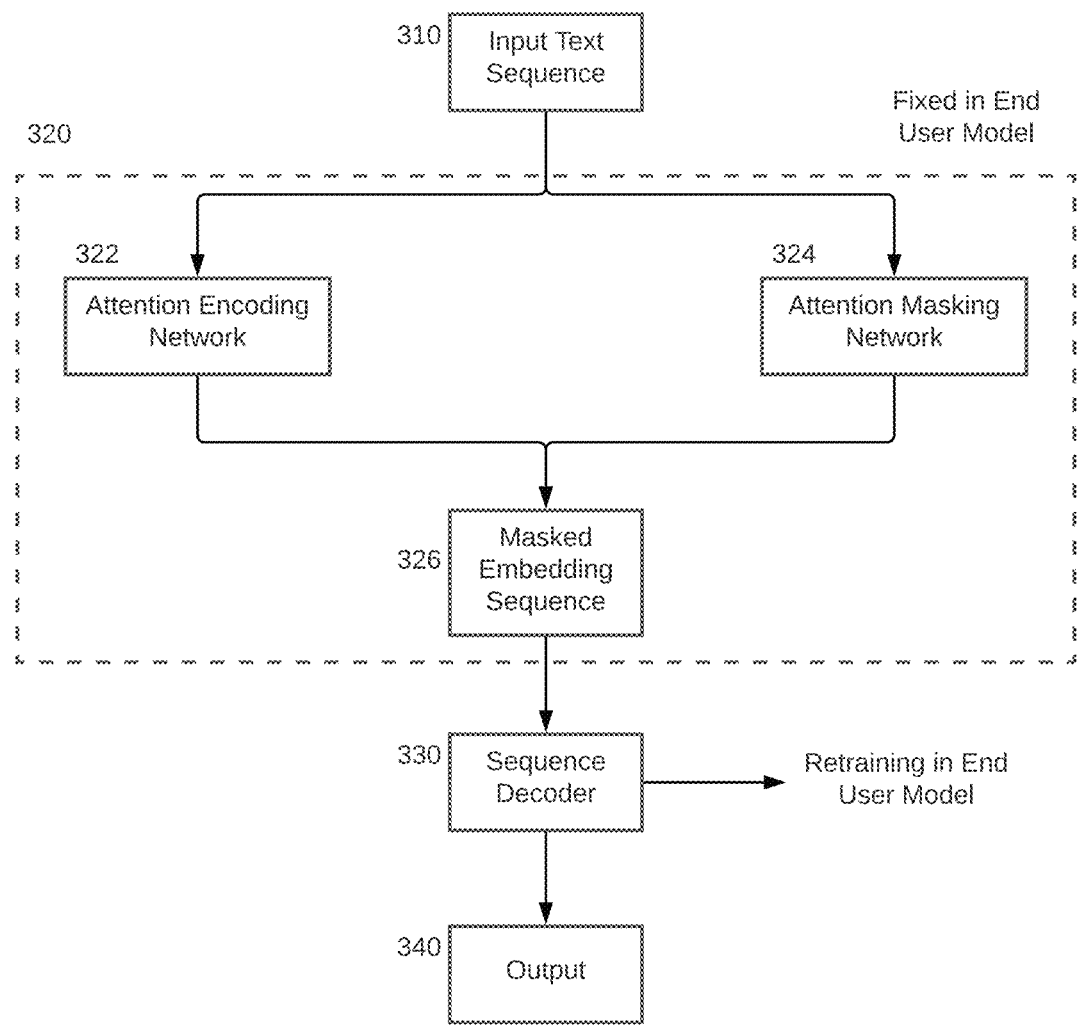
FIG. 3 is a high level diagram of a network according to an embodiment.

FIG. 3 shows two major modules of the model structure: (1) Attention Encoding Network; (2) Attention Masking Network. The attention masking network creates a masked positional vector to address conflicts and errors in the input text. The attention encoding network creates a memory bank of feature vectors for the sequence decoder to interpret and output.

FIG. 3 illustrates a high-level structure of the network, in which an input text sequence module 310 provides input text sequences to a mask encoding module. In an embodiment, mask encoding module 320, which the end user model cannot change, may include an attention encoding network 322 and an attention masking network 324. Attention encoding network 322 may include structure to create a memory bank of feature vectors Attention masking network 324 may create a masked positional vector to address conflicts and errors in input text coming from input text sequence module 310. Sequence decoding module 330 receives outputs of mask encoding module 320, interprets those outputs, and provides them appropriately as an output 340, and/or as corrections for retraining of the end user model.

Both of mask encoding module 320 and sequence decoding module 330 are trainable for the base model. The base model is trained and maintained at its origin (referred to herein as the host side). The training dataset for the base model includes a large quantity of text data containing error words or sequences which are simulated or augmented to reflect possible errors from the end users. In an embodiment, the training dataset includes sufficient data to prevent the kind of bias mentioned earlier. In the meantime, 25% of the overall dataset is reserved as a testing dataset for evaluating the base model. The base model should achieve overall 85% or higher accuracy in the evaluation and the model should correct 95% error from the input text, which outputs a reasonable or 'correct' English word, e.g. 'book' and 'boat'. Major errors in the evaluation should come from label conflicts between the input sequence and ground truth (GT) sequence, e.g. the (boak(input)→boat(GT)→book (Inference)) or (boak(input)→book(GT)→boat). Such label conflicts can result from end user preferences. In this way, the base model should be well trained, and will remember the input sequence pattern with masked attention encoding such as "boa*". "*" is masked or weighted less in the encoding vector.

In an embodiment, the base model may be constituted as a deep learning structure, with a plurality of layers. Training data for the base model is used to weight the nodes in those layers. Depending on how training of the end user model is to be carried out, in one embodiment, each end user may train its own output layer, with the base model being unchangeable (fixed) for that end user, and changeable only at the host side. In another embodiment, at the host side there may be a plurality of output layers, one for each end user. End user data goes to training the respective output layer for that end user. The remaining layers, from the input layer through one or more subsequent layers up to the output layer, again would be part of the base model, and still fixed for end users. Retraining of the base model would occur only at the host side, possibly using data used to train output layers for different end user models.

The end user model uses the same structure as is used to develop the base model. In an embodiment, the end user model only modifies or retrains the last (output) layer to provide customized outputs. In an embodiment, the output layer for the end user model ultimately may be given a relatively light weight. There can be several reasons for this. The base model is trained using a lot of data, some but not all of which may be specific to a particular end user. Accordingly, the training of the output layer, focusing on data that is specific to that end user, is a refinement of the overall model for that end user, and does not constitute a radically different reworking and/or retraining of the model for that end user. The end user model, including that output layer, can be trained and updated using only the computing system(s) (including any necessary or appropriate deep learning algorithms) at the end user side.

Figure 4:
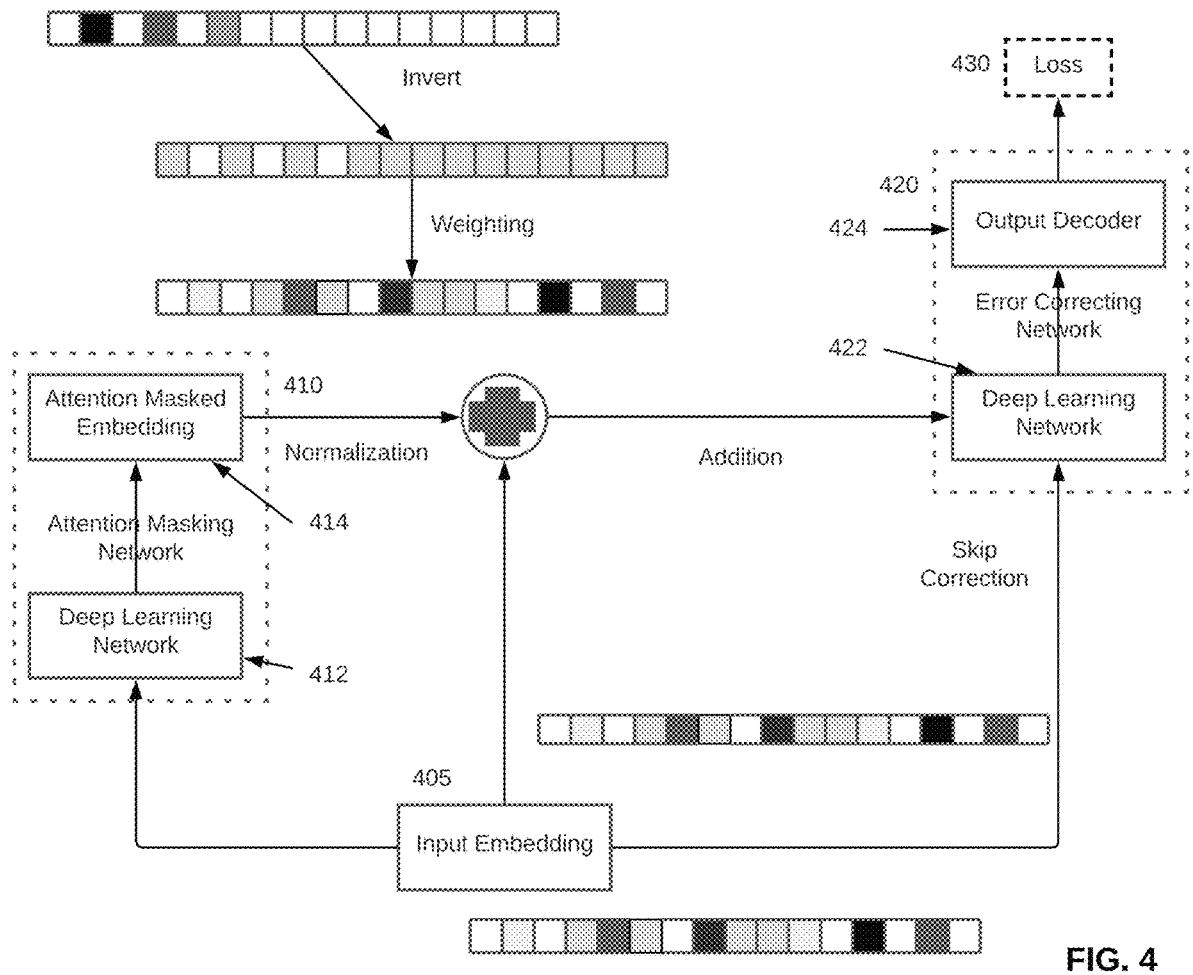
FIG. 4 is a high level diagram of a network according to an embodiment.

FIG. 4 shows the OCR and ICR network in a reverse order to the sequence that FIG. 3 shows. FIG. 4 shows details of modules inside the masking network (left) and correction network (right). On the left side of FIG. 4, an attention masking network 410 masks all the positions that are related to incorrect characters. In an embodiment, the attention masking network 410 applies a deep learning algorithm 412 to create a masked feature vector to be incorporated with an input vector for the correction network to decode for the final output. In an embodiment, the deep learning algorithm 412 is a bi-directional long short-term memory (Bi-LSTM).

On the right side of FIG. 4, a correction network 420 outputs a final sequence regarding to the input sequence. The previous discussion mentioned a masked position for the conflict or error position, to resolve data conflicts and to make multiple corrections. In an embodiment, correction network 420 includes a deep learning network 422. In an embodiment, deep learning network 422 may be a Bidirectional Encoder Representations from Transformers (BERT) network. In another embodiment, the network 422 may be a Bi-LSTM network. In another embodiment, network 422 may be a neural machine translation (NMT) network.

In an embodiment, an output of output decoder 424 in error correcting network 420 passes to loss block 430. In an embodiment, loss block 430 computes Connectionist Temporal Classification (CTC) loss. In another embodiment, loss block 430 may compute multilayer perceptron (MLP) loss. In another embodiment, loss block 430 may compute context encoder (CE) loss.

Figure 5:
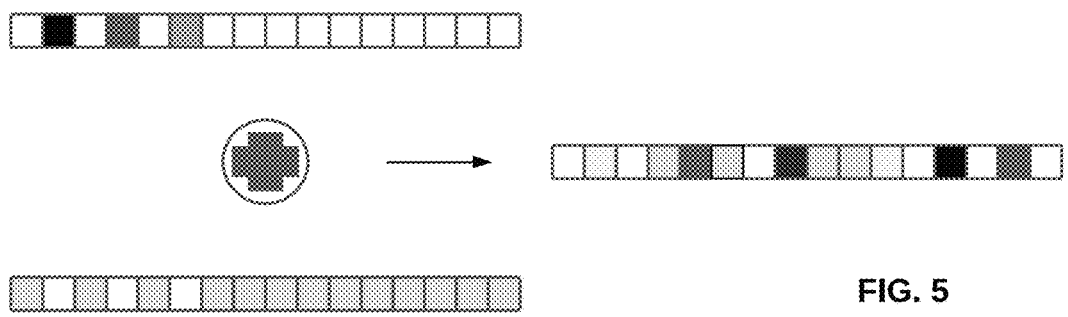
FIG. 5 shows examples of relevant masking positions according to an embodiment.

To increase the inference and accuracy of the network, an additional self-attention network may be provided to mask character positions relating to conflicts or incorrect characters. Such self-learned masking can be achieved with self-attention network training through determining correlations between the characters. FIG. 5 shows examples of relevant masking positions for data conflict and error characters. FIG. 5 shows vector composition (error masking embedding), in which the masked relevant positions are labeled as black and gray cubes (in the top sequence), while gray shows the original embedding vector of the input word (in the bottom sequence). In the plot, if the second position is a conflict or an incorrect character and the relevant positions are the fourth and sixth positions, then the mask also should be learned and applied to the relevant positions. The masked embedding vector is the input for the error correcting network 420 at the right hand side of FIG. 4.

Figures 6, 7:
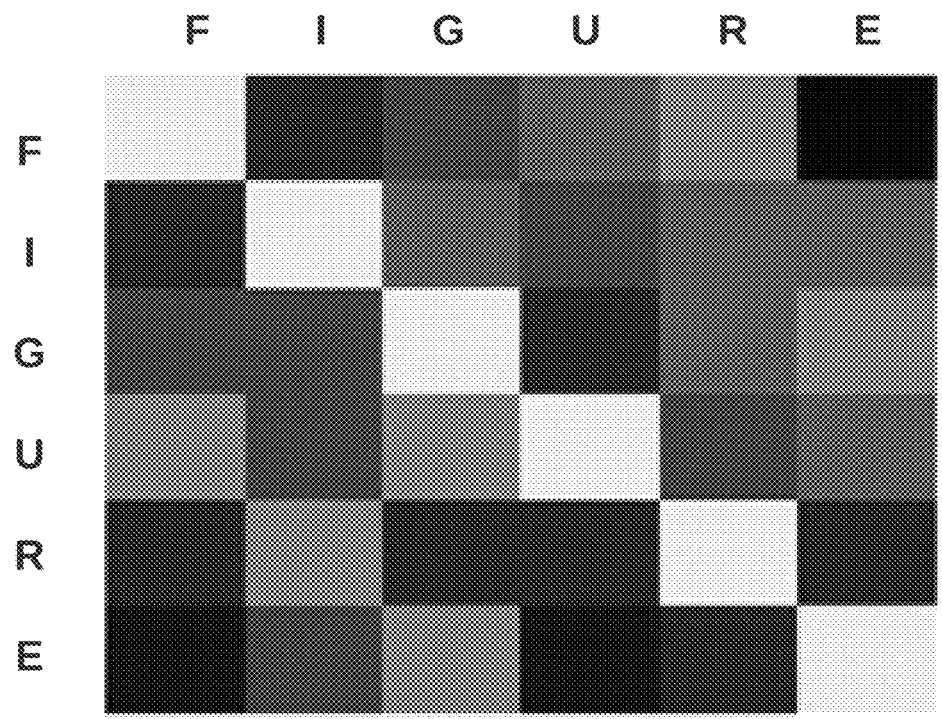
FIG. 6 is a table showing strengths of relationships between characters in accordance with embodiments.
FIG. 7 is a table showing strengths of relationships between characters in accordance with embodiments.

A self-learned attention matrix is a matrix that contains correlations between individual characters. FIG. 6 shows an example of a trained self-attention matrix between the characters in the word "FIGURE". In this example, darker shades indicate weaker relations, while lighter shades indicate stronger relations. In FIG. 6, the matrix shows strong and weak relationships between characters. This attention matrix is trainable, and may be included in the model.

The attention mask can be learned through the supervised learning, and it is strongly connected by the error mode and pattern of the input and ground truth text. The training dataset can be generated using edited distance (Levenshtein distance) between two sequences. The Levenshtein distance can measure the alignment between two related sequences. The minimum edited distance is calculated through an iterative process in the algorithm. Generally, there are several edits used in the Levenshtein distance: (1) replace; (2) insert; (3) delete; For example, the following figure demonstrates these common modifications between the error word 'Lavenshtien' and right word 'Levenshtein'.

FIG. 7 depicts an example of Levenshtein Distance between two words: the error word 'Lavenshtien' and the ground truth word 'Levenshtein'. The table in FIG. 7 shows distances between each possible aligned subsequence.

To generate a training pair to train the mask network, the results are converted from Levenshtein distances. Every edited position is marked, and a binary mask applied to represent correct and incorrect positions. Accordingly, for the FIG. 7 example of 'Lavenshtien' and 'Levenshtein', the labeling vector will be "0100001100" corresponding to three modifications: "replace a with e", "insert e behind t", and "delete e behind i".

In an embodiment, differing lengths between an input sequence and a ground truth sequence may be handled. For any insertion and deletion, there will be no addition of an extra length of digits to align with the ground truth sequence. For example, if the length of an input error word is '11' for 'Lavenshtien', the ground truth vector length still should be '11' with insertion and deletion operations. Deletion and insertion will change the length mapping between the input and target sequences. In an embodiment, a maximum number of deletion and insertion operations should not be less than half of the original characters in the ground truth word.

Input text can be a fixed maximum length. In an embodiment, a Connectionist Temporal Classification (CTC) may be applied to map the input sequence to the output sequence. There is no requirement the input text length and the output text length be equal. Accordingly, there is no requirement that the corrected text be the same size as the input text. As a result, it is possible to infer more characters with less character input. This aspect gives the overall system more flexibility for both the base model and end user model to be applied in general applications.

Experiments were conducted on corrections of Japanese text using the following networks:

BERT+CTC— Model M1
BERT+CE— Model M2
NMT+CTC— Model M3
NMT+CE— Model M4
Bi-LSTM+MLP— Model M5
Bi-LSTM+BERT+CE— Model M6
Bi-LSTM+BERT+CTC— Model M7

FIG. 8 is a table showing the different networks used in experiments (with models M1 to M7) to correct input text. The table shows that model M7, which comprised a Bi-LSTM masking network combined with a BERT correction network with CTC loss, was the most effective model. Model M7 achieved an overall accuracy of 91.42% with a 89.82% correction rate, with only a 2.2% broken rate for input text.

A further experiment also was conducted on Model M7, in which testing was done with data that looks similar to, but only two percent of which is the same as training data. The base model, which was tested first, was correct only 3.85 percent of the time. After a first iteration on the customer model, the customer model was correct 46.15 percent of the time, yielding a 42% correction gain over the base model.

Figure 9:
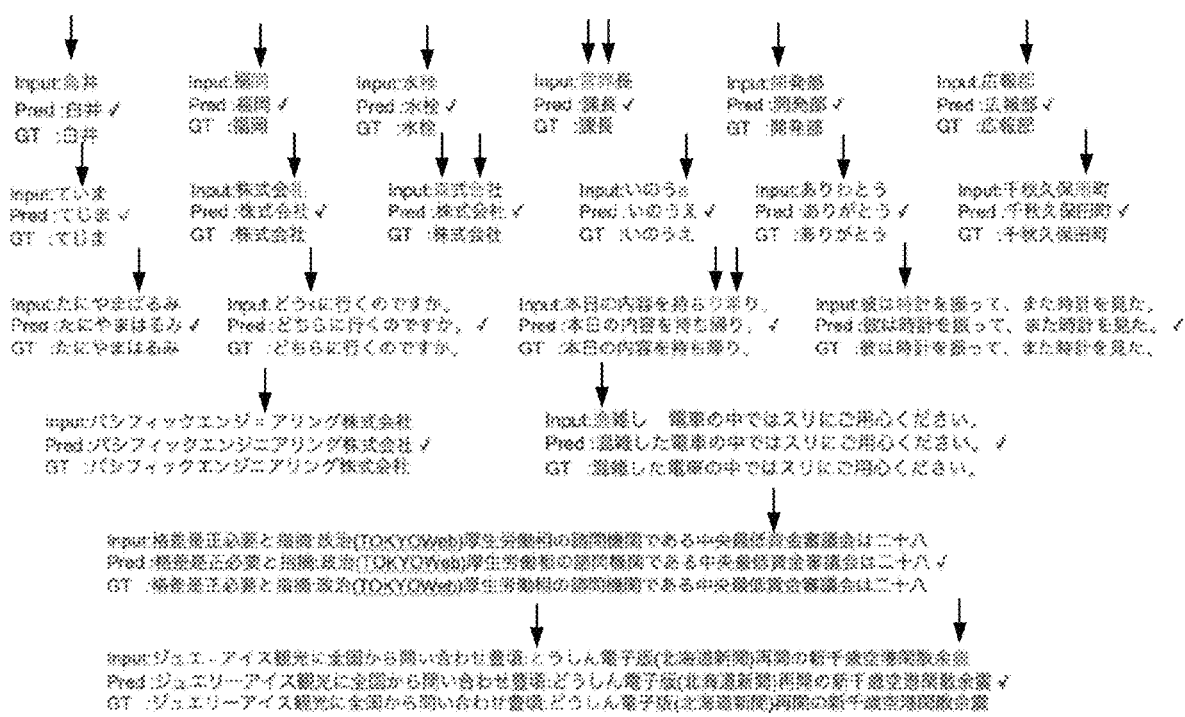
FIG. 9 shows examples of identification of text to be corrected.

FIG. 9 shows examples of input text, corrected/predicted text, and Ground Truth (GT) text. Arrows point to input items that are not predicted correctly, and do not correspond to ground truth text. Networks according to embodiments of the present invention can correct misspelled characters, fill in missing characters, and combine and correct additional characters.

Figure 10:
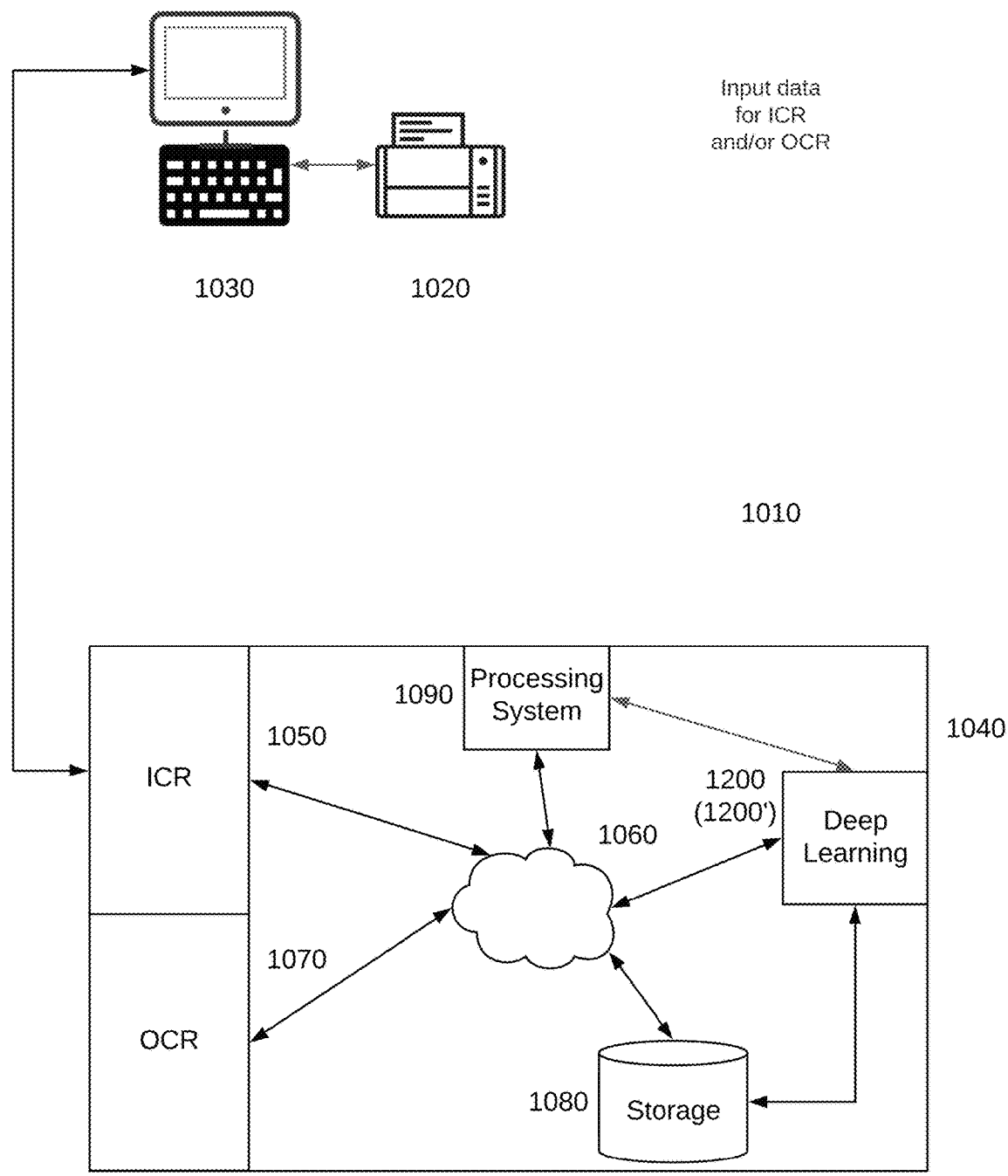
FIG. 10 shows a high-level example of a system for receiving input data and training a base model or an end user model according to an embodiment.

FIG. 10 is a high-level diagram of either a base model or an end user model system according to an embodiment. In FIG. 10, input text 1010 may be provided via a scanner or other input device 1020 to an ICR module 1050 or OCR module 1070 depending on the text recognition process to be carried out. A processing system 1040 may include a processing module 1090, which may communicate with either ICR module 1050 or OCR module 1070 as appropriate or necessary to provide requisite processing power, via one or more central processing units (CPUs) or graphics processing units (GPUs) and associated non-transitory storage and/or non-transitory memory. In an embodiment, processing system 1040 may communicate directly with either computer 1030 or scanner/input device 1020. Processing system 1040 may be self-contained, or may have its various elements connected via a network or cloud 1060. One or both of ICR module 1050 or OCR module 1070, each of which may have its own CPUs and/or GPUs, may communicate with processing module 1090 via the network or cloud 1060.

Figure 12A:
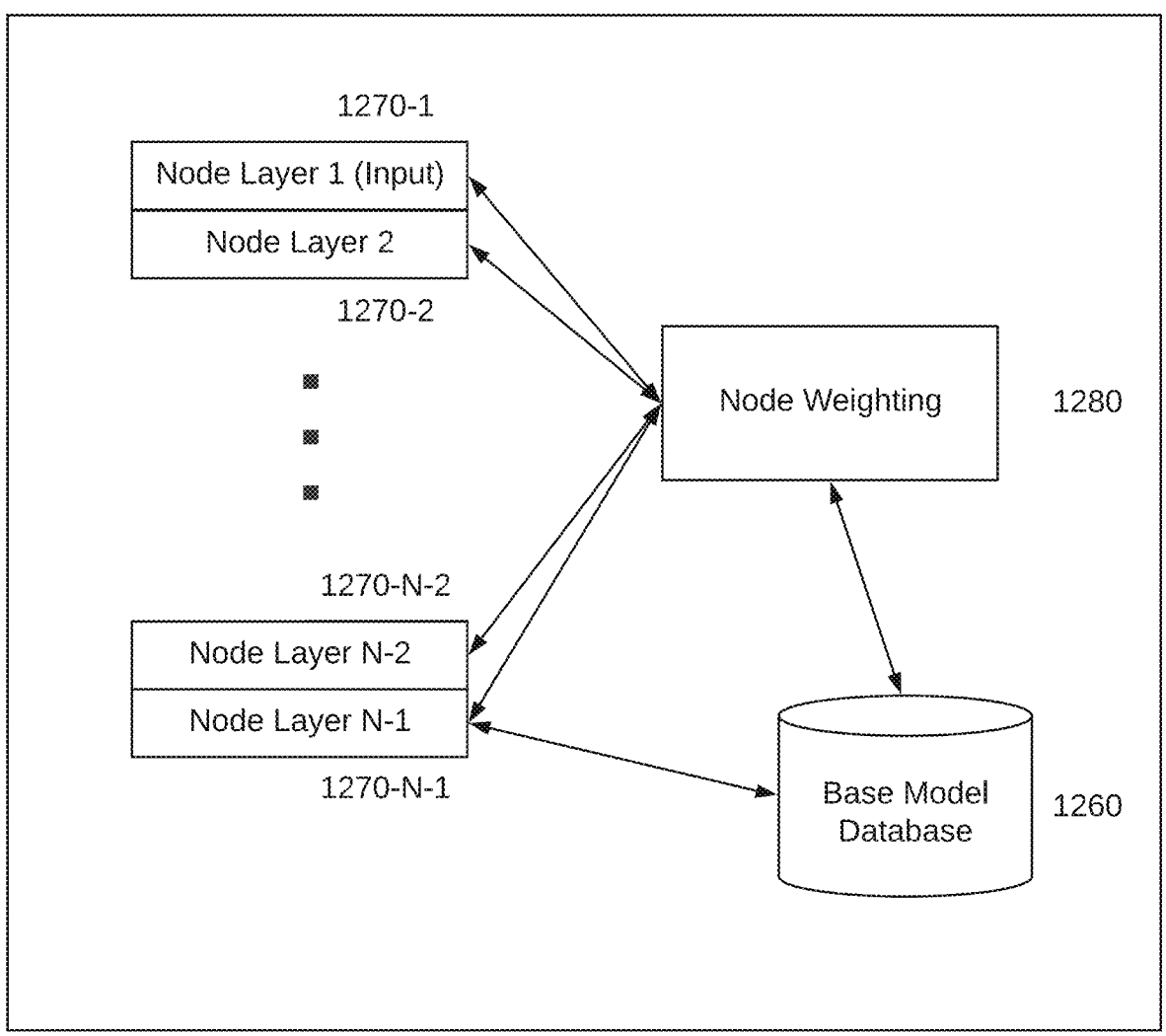
FIG. 12A shows a high-level example of a deep learning system for base model training according to an embodiment.

Deep learning system 1200 (1200'), which will be described in more detail below with reference to FIGS. 12A and 12B, handles changes to the base model in the host system, or to the end user model in the end user system.

Figure 11A:
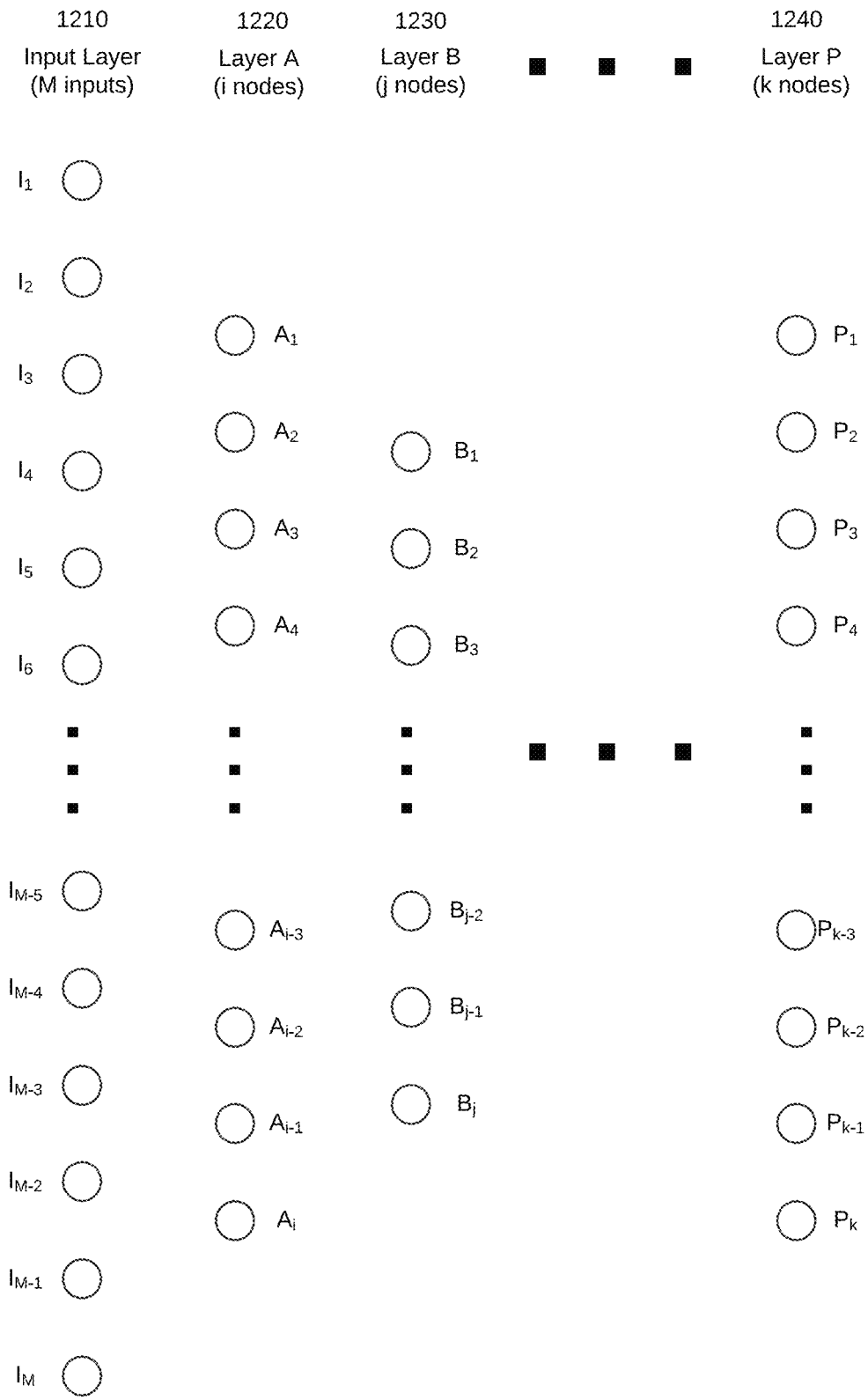
FIG. 11A shows a high-level example of nodes for a base deep learning model according to an embodiment.

FIG. 11A is a high-level diagram of a base model deep learning system according to an embodiment. Base model 1200 has an input layer 1210 comprising a plurality of nodes. Depending on the system, there may be one or more intermediate layers 1220-1240 (FIG. 11A shows P such layers, where P is a positive integer), each of the intermediate layers in turn comprising a plurality of nodes. As ordinarily skilled artisans will appreciate, training the base model involves assigning weights to the various nodes in the various layers, based on input training data that may include large amounts of data that is not specific to a particular end user need. In that case, the training at the end user will provide the training of the output layer.

In an embodiment, the last intermediate layer 1240 provides the output of the base model.

Figure 11B:
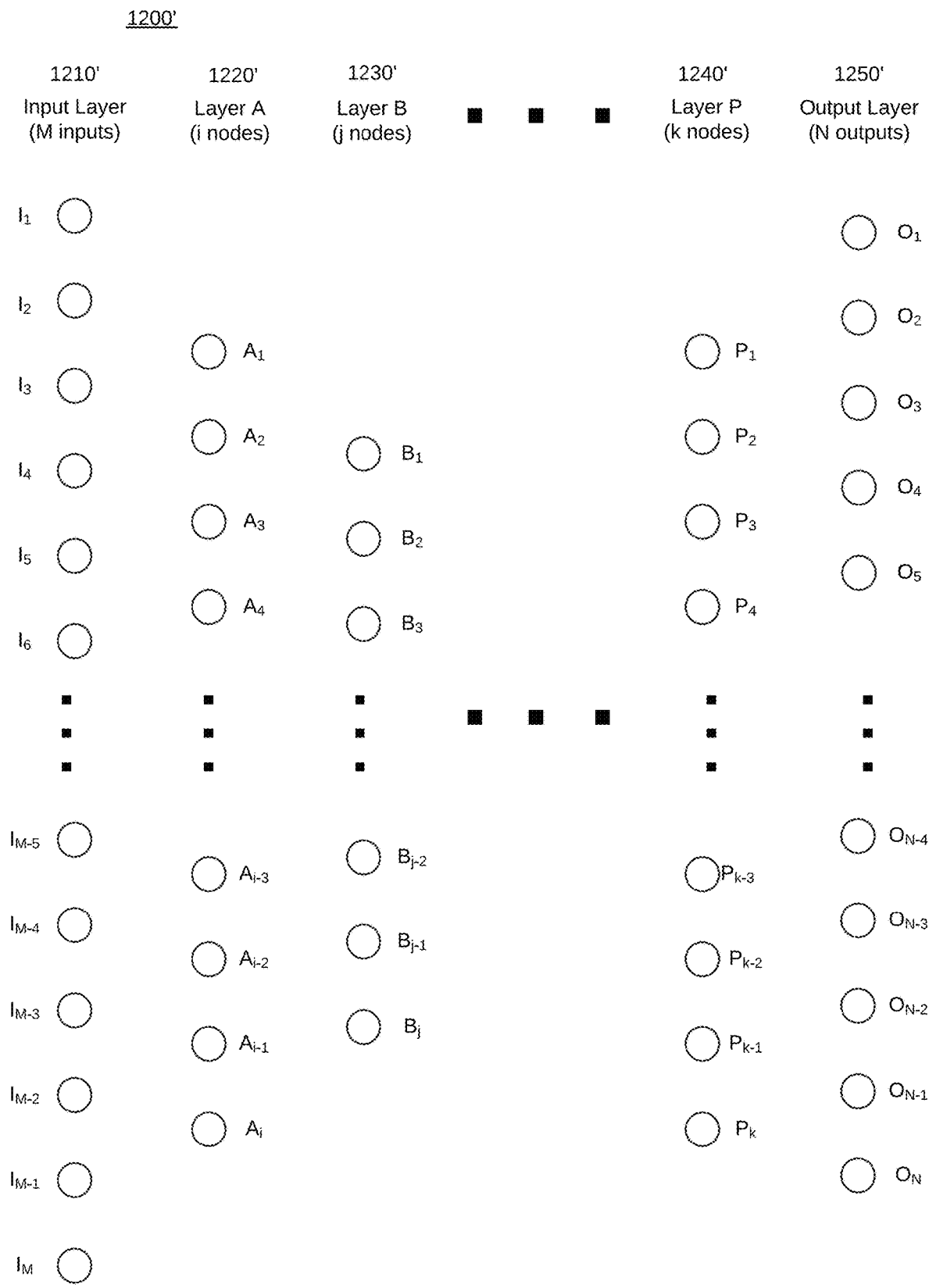
FIG. 11B shows a high-level example of nodes for an end user deep learning model according to an embodiment.

FIG. 11B is a high-level diagram of end user model deep learning system according to an embodiment. End user model 1200' has an input layer 1210' comprising a plurality of nodes. Depending on the system, there may be one or more intermediate layers 1220'-1240' (FIG. 11B shows P' such layers, where P' is a positive integer), each of the intermediate layers in turn comprising a plurality of nodes. As ordinarily skilled artisans will appreciate, training the end user model involves assigning weights to the various nodes in the various layers, based on input training data that may include large amounts of data that is not specific to a particular end user need.

It should be noted that in an embodiment, end users are unable to modify the base model themselves. End user changes focus on the particular end user needs around the output layer. In deep learning model embodiments employing backpropagation, weighting of nodes in one or more of the input or intermediate layers of the end user model deep learning system may be altered. Such alterations may filter back to the base model in some form, depending on how datasets from different end users are presented to the base model deep learning system, and on how large those datasets are, among other things. These and other possibilities were discussed in more detail above. Fundamentally, however, even if the end user model provides outputs indicating that any weightings in the base model need to be changed, such change will occur at the host side, which controls the base model FIG. 12A shows a little more detail of base model deep learning system 1200. Base model database 1260 stores weights and data for the base model. Node weighting module 1270 calculates weights for the various nodes in the various layers based on comparison with results, among other things, and assigns those weights to layers 1270-1, 1270-2, . . . 1270-N-2, and 1270-N-1 accordingly. In this fashion, the base model provides a basis for end user model 1200' (FIG. 12B) to apply end user training.

Figure 12B:
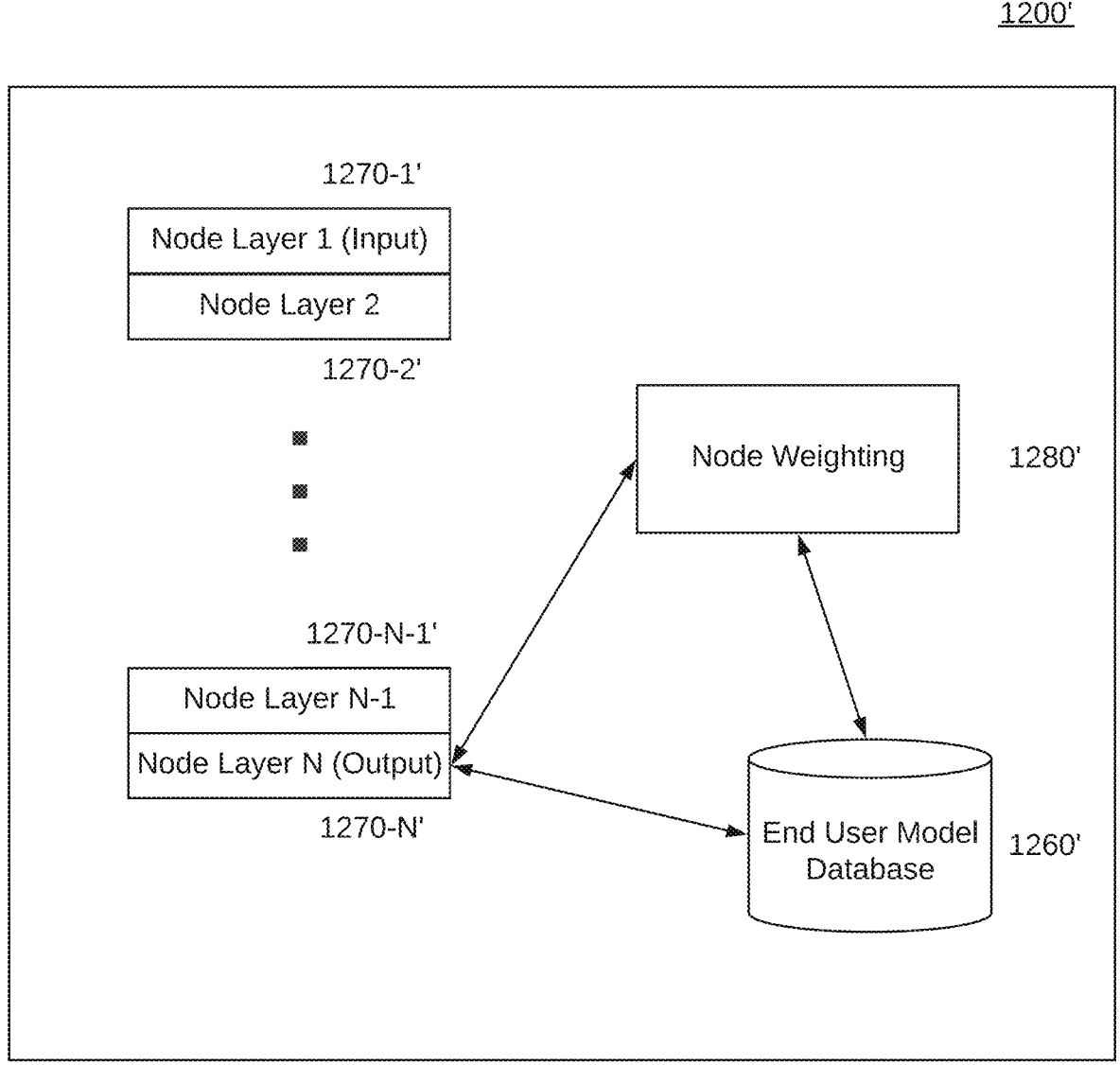
FIG. 12B shows a high-level example of a deep learning system for end user model training according to an embodiment.

FIG. 12B shows a little more detail of end user model deep learning system 1200'. Similarly to FIG. 12A, end user model database 1260' stores weights and data for the end user model. Node weighting module 1270' calculates weights for nodes in output layer 1270-N'. In an embodiment, end user model deep learning system 1200' does not affect weights of any other layers in the model, because those layers belong to the base model. In this embodiment, any retraining of the base model or weighting of any of the nodes of any of the layers of the base model comes through retraining of the base model, and not through retraining of the end user model.

While aspects of the present invention have been described in detail with reference to various drawings, ordinarily skilled artisans will appreciate that there may be numerous variations within the scope and spirit of the invention. Accordingly, the invention is limited only by the following claims.

What is claimed is:

1. A computer-implemented text correction method comprising:

with a processor, providing one of base data and end user data to pretrain a base deep learning model or an end user deep learning model, respectively, as a pretrained base deep learning model or a pretrained end user deep learning model;

providing a processor-based data mode classifier to select one of the pretrained base deep learning model or a pretrained end user deep learning model;

responsive to an input dataset, selecting one of the pretrained base deep learning model or the processor-based data mode classifier;

responsive to an output of the data mode classifier, performing training on one of the base deep learning model or the end user deep learning model;

responsive to a size of the dataset, performing retraining on one of the base deep learning model or the end user deep learning model;

responsive to the training of one of the base deep learning model or the end user deep learning model, providing outputs signifying a confidence level of the training; and responsive to the confidence level of the training, providing output text to an end user.

2. The computer-implemented text correction method of claim 1, wherein the text correction comprises one or more of image character recognition (ICR) and optical character recognition (OCR).

3. The computer-implemented text correction method of claim 1, further comprising:
responsive to providing the outputs to the end user, performing correction of the output text.

4. The computer-implemented text correction method of claim 1, further comprising:
responsive to the input dataset, performing training on the base deep learning model; and
responsive to a size of the dataset, performing retraining on the base deep learning model.

5. The computer-implemented text correction method of claim 1, further comprising:
responsive to an output of the data mode classifier, performing training on the base deep learning model; and
responsive to a size of the dataset, performing retraining on the base deep learning model.

6. The computer-implemented text correction method of claim 1, further comprising:
responsive to an output of the data mode classifier, performing training on the end user deep learning model;
responsive to a size of the dataset, performing retraining on the end user deep learning model.

7. The computer-implemented text correction method of claim 6, wherein training and retraining of the end user deep learning model does not affect the base deep learning model.

8. The computer-implemented text correction method of claim 1, wherein the base deep learning model and the end user deep learning model are selected from the group consisting of Bidirectional Encoders from Transformers (BERT) Bidirectional Long Short Term Memory (Bi-LSTM) and Neural Machine Translation (NMT).

9. The computer-implemented text correction method of claim 7, wherein the base deep learning model and the end user deep learning model comprise a Bi-LSTM and BERT model with Connectionist Temporal Classification (CTC) loss.

10. The computer-implemented text correction method of claim 1, wherein the end user deep learning model comprises the base deep learning model and an output layer at an output of the base deep learning model.

11. A computer-implemented text correction apparatus comprising:
a processor; and
non-transitory memory containing instructions which, when performed by a processor, enable performance of a method comprising:
providing one of base data and end user data to pretrain a base deep learning model or an end user deep learning model, respectively, as a pretrained base deep learning model or a pretrained end user deep learning model;
providing data mode classifier to select one of the pretrained base deep learning model or a pretrained end user deep learning model;
responsive to an input dataset, selecting one of the pretrained base deep learning model or the processor-based data mode classifier;
responsive to an output of the data mode classifier, performing training on one of the base deep learning model or the end user deep learning model;
responsive to a size of the dataset, performing retraining on one of the base deep learning model or the end user deep learning model;
responsive to the training of one of the base deep learning model or the end user deep learning model, providing outputs signifying a confidence level of the training; and
responsive to the confidence level of the training, providing output text to an end user.

12. The computer-implemented text correction apparatus of claim 11, wherein the text correction comprises one or more of image character recognition (ICR) and optical character recognition (OCR).

13. The computer-implemented text correction apparatus of claim 11, wherein the method further comprises:
responsive to the confidence level of the training, providing output text to an end user.

14. The computer-implemented text correction apparatus of claim 11, wherein the method further comprises:
responsive to the input dataset, performing training on the base deep learning model; and
responsive to a size of the dataset, performing retraining on the base deep learning model.

15. The computer-implemented text correction apparatus of claim 11, wherein the method further comprises:
responsive to an output of the data mode classifier, performing training on the base deep learning model; and
responsive to a size of the dataset, performing retraining on the base deep learning model.

16. The computer-implemented text correction apparatus of claim 11, wherein the method further comprises:
responsive to an output of the data mode classifier, performing training on the end user deep learning model;
responsive to a size of the dataset, performing retraining on the end user deep learning model.

17. The computer-implemented text correction apparatus of claim 16, wherein training and retraining of the end user deep learning model does not affect the base deep learning model.

18. The computer-implemented text correction apparatus of claim 11, wherein the base deep learning model and the end user deep learning model are selected from the group consisting of Bidirectional Encoders from Transformers (BERT) Bidirectional Long Short Term Memory (Bi-LSTM) and Neural Machine Translation (NMT).

19. The computer-implemented text correction apparatus of claim 18, wherein the base deep learning model and the end user deep learning model comprises a Bi-LSTM and BERT model with Connectionist Temporal Classification (CTC) loss.

20. The computer-implemented text correction apparatus of claim 11, wherein the end user deep learning model comprises the base deep learning model and an output layer at an output of the base deep learning model.

\* \* \* \* \*